United States Patent
Tate (10) Patent No.: US 10,671,091 B2
(45) Date of Patent: Jun. 2, 2020

(54) FLIGHT CONTROL DEVICE AND FLIGHT CONTROL METHOD FOR UNMANNED AERIAL VEHICLE

(71) Applicant: ALPINE ELECTRONICS, INC., Shinagawa-ku, Tokyo (JP)

(72) Inventor: Yosuke Tate, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 262 days.

(21) Appl. No.: 15/901,074

(22) Filed: Feb. 21, 2018

(65) Prior Publication Data

US 2018/0253110 A1   Sep. 6, 2018

(30) Foreign Application Priority Data

Mar. 3, 2017   (JP) ................................. 2017-040709
Dec. 20, 2017  (JP) ................................. 2017-244355

(51) Int. Cl.
| | |
|---|---|
| *G05D 1/06* | (2006.01) |
| *B64C 39/02* | (2006.01) |
| *G08G 5/00* | (2006.01) |

(52) U.S. Cl.
CPC .......... *G05D 1/0607* (2013.01); *B64C 39/024* (2013.01); *G08G 5/0021* (2013.01); *G08G 5/0039* (2013.01); *G08G 5/0069* (2013.01); *B64C 2201/128* (2013.01); *B64C 2201/141* (2013.01)

(58) Field of Classification Search
CPC .... G05D 1/0607; G05D 1/101; G05D 1/0808; G08G 5/0039; G08G 5/0021; G08G 5/0069; B64C 39/024; B64C 2201/141; B64C 2201/128
USPC ............................................................ 701/5
See application file for complete search history.

(56) References Cited

U.S. PATENT DOCUMENTS

2017/0269611 A1*  9/2017  Rangarajan ........... B64C 39/024

FOREIGN PATENT DOCUMENTS

| JP | 6051327 | 12/2016 |
|---|---|---|
| TW | I 558617 B | * 12/2016 |
| WO | WO2017/203552 | 11/2017 |

\* cited by examiner

*Primary Examiner* — Brian P Sweeney
(74) *Attorney, Agent, or Firm* — Brinks Gilson & Lione

(57) ABSTRACT

When an unmanned aerial vehicle flies in accordance with a planned route that is set in advance on the basis of a position of a GPS receiver measured by a measurement unit and the measurement accuracy detected by a measurement accuracy detection unit has decreased to be less than a predetermined value, a flight control unit performs control so that the unmanned aerial vehicle flies along a route different from the planned route. Moreover, when flying along the planned route lowers the measurement accuracy, the unmanned aerial vehicle is caused to fly along the route different from the planned route. Therefore, the flight can be continued while the position is measured with the measurement accuracy secured.

20 Claims, 8 Drawing Sheets

FLIGHT CONTROL DEVICE AND FLIGHT CONTROL METHOD FOR UNMANNED AERIAL VEHICLE

RELATED APPLICATION

The present application claims priority to Japanese Patent Application Number 2017-040709, filed Mar. 3, 2017, and Japanese Patent Application Number 2017-244355, filed Dec. 20, 2017, the entirety of which is hereby incorporated by reference.

BACKGROUND

1. Field of the Invention

The present invention relates to a flight control device and a flight control method for an unmanned aerial vehicle, and in particular is preferably applicable to a device that controls the flight of an unmanned aerial vehicle in accordance with a planned route on the basis of a measured position.

2. Description of the Related Art

Compact unmanned aerial vehicles (drones), which have been enjoyed as hobbies, are now used widely in industrial fields. For example, drones are often used for remote sensing in topography surveys, disaster investigations, infrastructure inspections, and the like in places where people cannot go. For example, in patrol inspection work at rivers, drones can be used in the places where people cannot go, such as in the mountains. Using drones can support visual inspection and can automatically photograph abnormalities such as a landslide and the like around the rivers. Additionally, drones have come to be used to transport articles.

When the drone is flown to a place where people cannot go to conduct the patrol inspection at rivers or transport articles, the drone flies out of sight. In this case, the drone needs to fly with an autonomous control along a planned route that is set in advance without being monitored by an operator while knowing its position from received GPS radio waves. In such a case, how the drone achieves its autonomous flight in an environment where the drone cannot receive the GPS radio waves is a problem.

For example, in the patrol inspection at rivers, the places where the drone flies out of sight may include a deep valley. In such a case, the planned route that is set in advance may be surrounded by mountains and the drone may fail to receive the GPS radio waves. If the drone cannot receive the GPS radio waves, the drone may fail to maintain the correct position and in the worst case, the drone may collide with an obstacle and crash. When the drone is used to transport articles, the same problem can occur depending on the route.

Some known unmanned aerial vehicles determine whether the vehicle is approaching a crash avoidance area such as a residential area during the flight along the planned route, and if it is determined that the vehicle is approaching such an area, the flight speed is increased (for example, see Japanese Patent No. 6051327).

SUMMARY

According to the unmanned aerial vehicle in Japanese Patent No. 6051327, even if the flying unmanned aerial vehicle loses control due to sudden trouble and crashes, it is possible to avoid a crash in the crash avoidance area as much as possible. However, this unmanned aerial vehicle cannot solve the problem where the flying unmanned aerial vehicle cannot continue flight along the correct position on the planned route because the vehicle has failed to receive the GPS radio waves.

The present disclosure has been made in order to solve the problem, and an object is to, even if the measurement accuracy of the unmanned aerial vehicle flying in accordance with the planned route has decreased, enable the unmanned aerial vehicle to continue the flight with the measurement accuracy secured.

In order to solve the above problem, in the present disclosure, when the unmanned aerial vehicle flies in accordance with a planned route that is set in advance on the basis of a position or a direction measured by a measurement unit and the measurement accuracy has decreased to be less than a predetermined value, the unmanned aerial vehicle flies in accordance with a route that is different from the planned route.

According to the present disclosure with the above structure, when flying along the planned route lowers the measurement accuracy, the unmanned aerial vehicle is caused to fly along the route different from the planned route; therefore, the decrease in measurement accuracy can be avoided and moreover, the flight can be continued while the position or the direction is measured. Thus, even when the measurement accuracy of the unmanned aerial vehicle flying in accordance with the planned route becomes low, the flight can be continued with the measurement accuracy secured.

DETAILED DESCRIPTION OF THE PREFERRED EMBODIMENTS

First Embodiment

Figure 1:
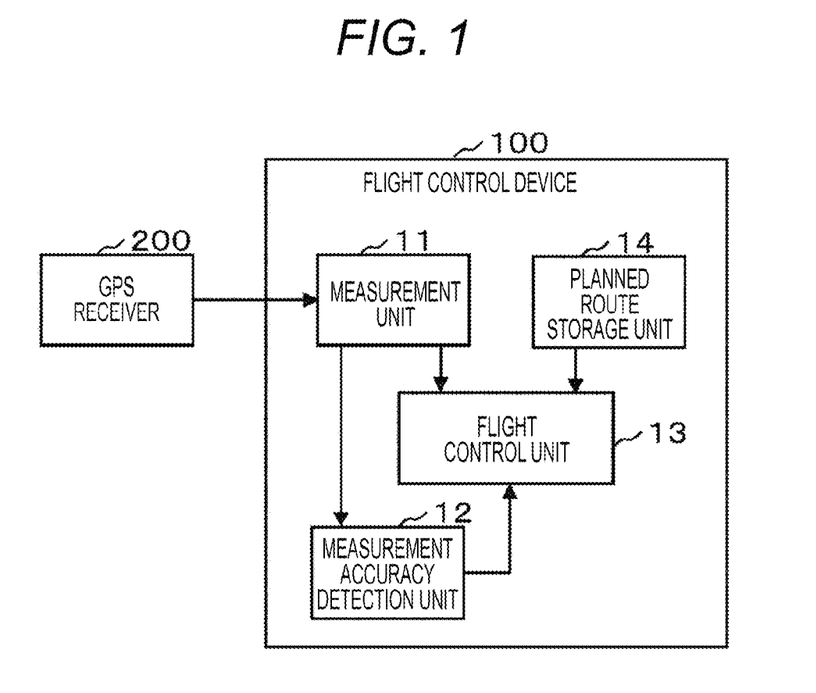
FIG. 1 is a diagram illustrating an example of a functional structure of a flight control device according to a first embodiment.

A first embodiment of the present invention will hereinafter be described with reference to drawings. FIG. 1 is a diagram illustrating an example of a functional structure of a flight control device according to the first embodiment. A flight control device 100 according to the first embodiment is mounted on an unmanned aerial vehicle (drone), and based on the position and the altitude measured using a GPS receiver 200, the flight control device 100 autonomously controls the flight of the drone in accordance with a planned route.

As illustrated in FIG. 1, the flight control device 100 according to the first embodiment includes a measurement unit 11, a measurement accuracy detection unit 12, and a flight control unit 13 as a functional structure thereof. In addition, the flight control device 100 includes a planned route storage unit 14 as a storage medium.

Each of the function blocks 11 to 13 can be configured by any of hardware, a digital signal processor (DSP), and software. For example, when the function blocks 11 to 13 are configured by software, each of the function blocks 11 to 13 is configured by a CPU, a RAM, a ROM, or the like of a computer, and is achieved by the operation of programs stored in a storage medium such as a RAM, a ROM, a hard disk, or a semiconductor memory.

The planned route storage unit 14 is to store information on a planned route in which a flight route of a drone is set in advance. The planned route is formed by a plurality of waypoints of a route along which the drone will fly. Each waypoint has the information of latitude, longitude, and altitude. The drone autonomously flies to follow the waypoints in order.

The waypoints may be set by a computer different from the flight control device 100 (for example, a personal computer, a smart phone, or a dedicated terminal called a grand station). Then, the planned route information including the set waypoints is stored in the planned route storage unit 14 of the flight control device 100. Note that the flight control device 100 may have a function of setting the planned route (waypoints).

The measurement unit 11 measures the altitude and the position (latitude, longitude) of the drone on the basis of the GPS radio waves received in the GPS receiver 200. The measurement accuracy detection unit 12 detects the measurement accuracy measured by the measurement unit 11. The measurement accuracy can be detected as, for example, a reception intensity of the GPS radio waves. Alternatively, the number of GPS satellites that can receive the GPS radio waves at a predetermined reception intensity or more may be detected as the measurement accuracy.

Figure 2A:
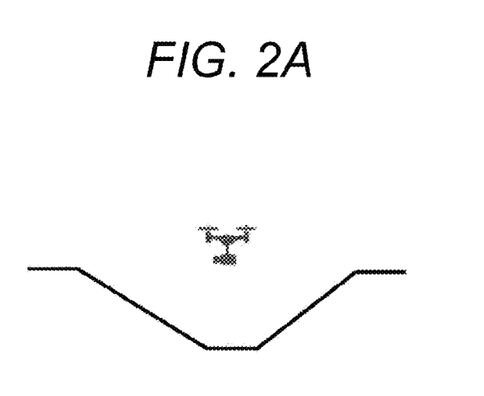
FIGS. 2A and 2B are diagrams for describing a reception status of GPS radio waves in the mountains.
Figure 2B:
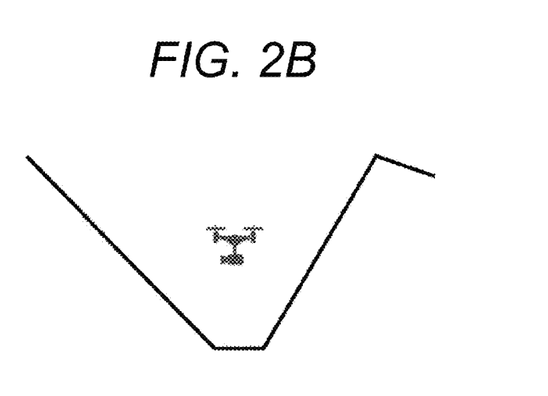

FIGS. 2A and 2B are diagrams for describing a reception status of the GPS radio waves in the case where the drone is used in patrol inspection in the mountains. FIG. 2A illustrates a situation in which the valley is not very deep and the drone is not surrounded by mountains. In this case, the GPS measurement accuracy is excellent. On the other hand, FIG. 2B illustrates a situation in which the drone is flying at relatively low altitude in the deep valley and the drone is surrounded by mountains. In this case, the GPS measurement accuracy may become low.

The flight control unit 13 controls the flight of the drone in accordance with the planned route set in advance in the planned route storage unit 14 on the basis of the position and the altitude measured by the measurement unit 11. In addition, the flight control unit 13 performs control so that when the measurement accuracy detected by the measurement accuracy detection unit 12 becomes less than a predetermined value, the drone flies along a route different from the planned route.

That is to say, the flight control unit 13 controls the drone so as to fly along a route different from the planned route when the reception intensity of the GPS radio waves detected by the measurement accuracy detection unit 12 becomes less than a predetermined value or when the number of GPS satellites that can receive the GPS radio waves at a predetermined reception intensity or more becomes less than a predetermined value. Here, the route different from the planned route (hereinafter also referred to as a different route) is a route for causing the drone to ascend higher than the planned route (only the altitude is increased) from the place where the decrease in measurement accuracy is detected and then returning the drone to another place on the planned route.

Figure 3:
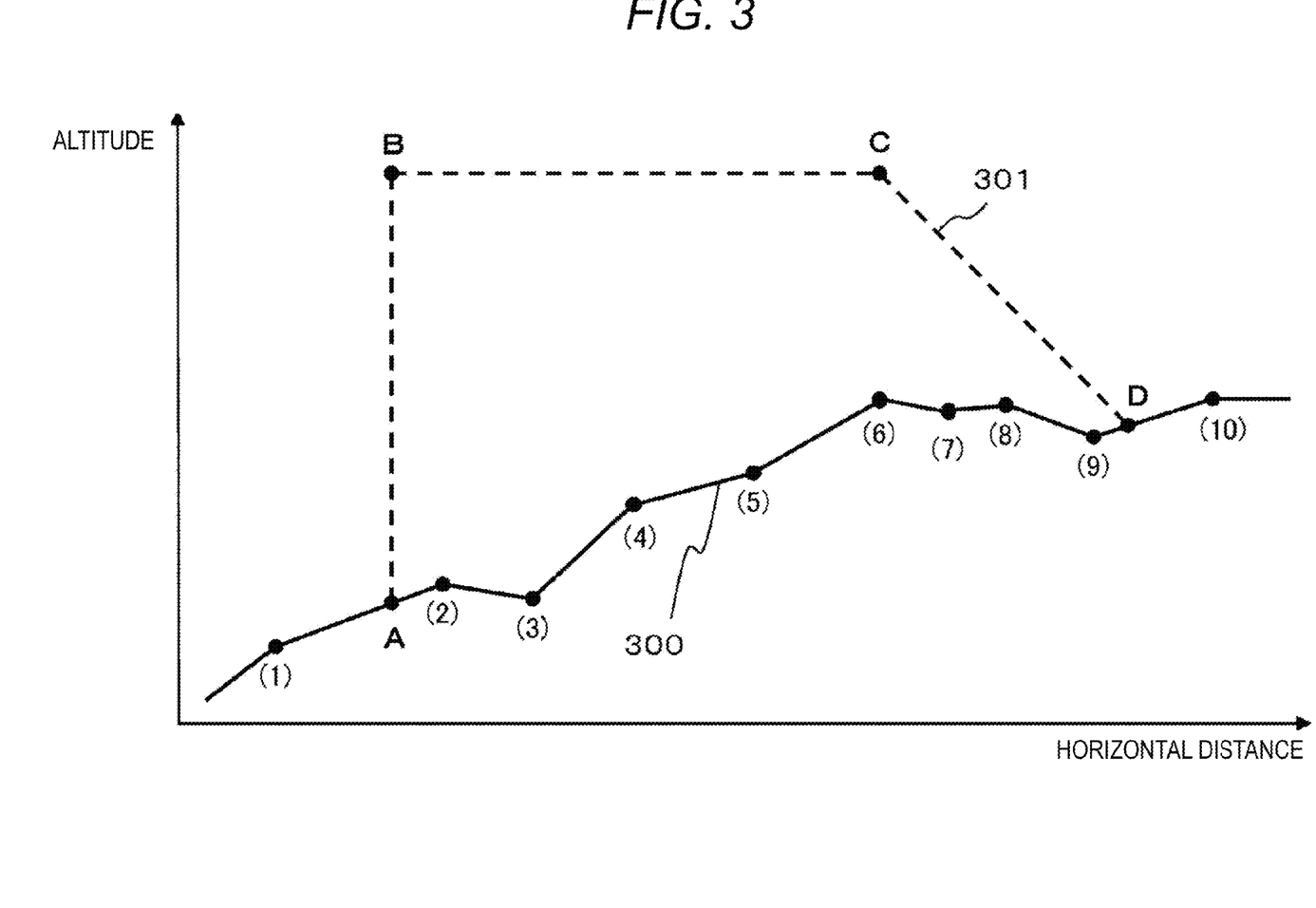
FIG. 3 is a diagram for describing a different route according to the first embodiment.

FIG. 3 is a diagram for describing the different route according to the first embodiment. In FIG. 3, waypoints (1) to (10) indicate the positions and the altitudes of ten successive waypoints. Here, for convenience, the positions of the waypoints (1) to (10) are expressed only one-dimensionally along the horizontal axis and are not expressed two-dimensionally on a horizontal plane.

In FIG. 3, it is assumed that, during the flight of the drone in accordance with a planned route 300, the measurement accuracy detected by the measurement accuracy detection unit 12 becomes less than the predetermined value at a place A between the waypoint (1) and the waypoint (2). In this case, the flight control unit 13 performs control so that the drone flies in accordance with a different route 301 from the place A, and returns to a different place D on the planned route 300. The flight along the different route 301 includes three stages of an ascent flight stage, a maintaining flight stage, and a descent flight stage.

That is to say, first, the flight control unit 13 causes the drone to ascend higher than the planned route 300 by changing only the altitude without changing the latitude and longitude from the place A in the ascent flight stage. Here, the flight control unit 13 causes the drone to ascend to a place B where the measurement accuracy detected by the measurement accuracy detection unit 12 becomes the predetermined value or more.

Next, the flight control unit 13 causes the drone to shift to the maintaining flight stage, in which the drone flies along the planned route 300 without changing the horizontal trajectory of the planned route 300 while maintaining the altitude at the place B where the drone has ascended in the ascent flight stage (hereinafter referred to as GPS reception altitude). That is to say, the flight control unit 13 causes the drone to fly at the GPS reception altitude, which is different from the altitude at the waypoints (2) and the subsequent waypoints on the planned route 300, in accordance with the latitude and longitude at the waypoints (2) and the subsequent waypoints.

Then, the flight control unit 13 causes the drone to fly by a predetermined distance or fly for a predetermined time to a place C at the GPS reception altitude, and after that, causes the drone to shift to the descent flight stage. The place C where the maintaining flight stage ends may be away from the place B by a predetermined number of waypoints. In the descent flight stage, the flight control unit 13 controls the flight of the drone so that the drone returns to the different place D on the planned route 300 by gradually decreasing the altitude while causing the drone to travel along the planned route 300 without changing the horizontal trajectory of the planned route 300. That is to say, the flight control unit 13 gradually decreases the altitude from the GPS reception altitude while causing the drone to travel in accordance with the latitude and longitude shown by the waypoint (6) and the subsequent waypoints on the planned route 300.

The different place D on the planned route 300 to which the drone is returned may be, for example, a place where the altitude measured by the measurement unit 11 coincides with the altitude of the planned route 300 after the altitude of the drone is decreased at a predetermined rate per unit time or per unit flight distance from the place C (the unit flight distance may be a horizontal flight distance or a flight trajectory distance). When one waypoint and the next waypoint are connected with a line, the altitude of the planned route 300 in this case corresponds to the altitude on that line. In this case, the flight control unit 13 may set an additional waypoint at a position of an intersection between the trajectory in the case where the altitude of the drone is decreased at the predetermined rate per unit time or per unit flight distance from the place C and the line connecting between the one waypoint and the next waypoint, and then control the drone so that the drone flies toward the additional waypoint. FIG. 3 illustrates a state in which the intersection is set to the restoration place D.

Alternatively, the restoration place D may be set in advance when the drone flies along the different route 301 from the place A, and the control may be performed to gradually decrease the altitude of the drone from the place C to the place D so that the drone is returned to the set restoration place D. How to set the restoration place D in this case may be arbitrarily selected. In one example, a place away from the place A by a predetermined distance can be set as the restoration place D. In another example, a waypoint at a position away from the place A by a predetermined distance or more can be set as the restoration place D.

Figure 4:
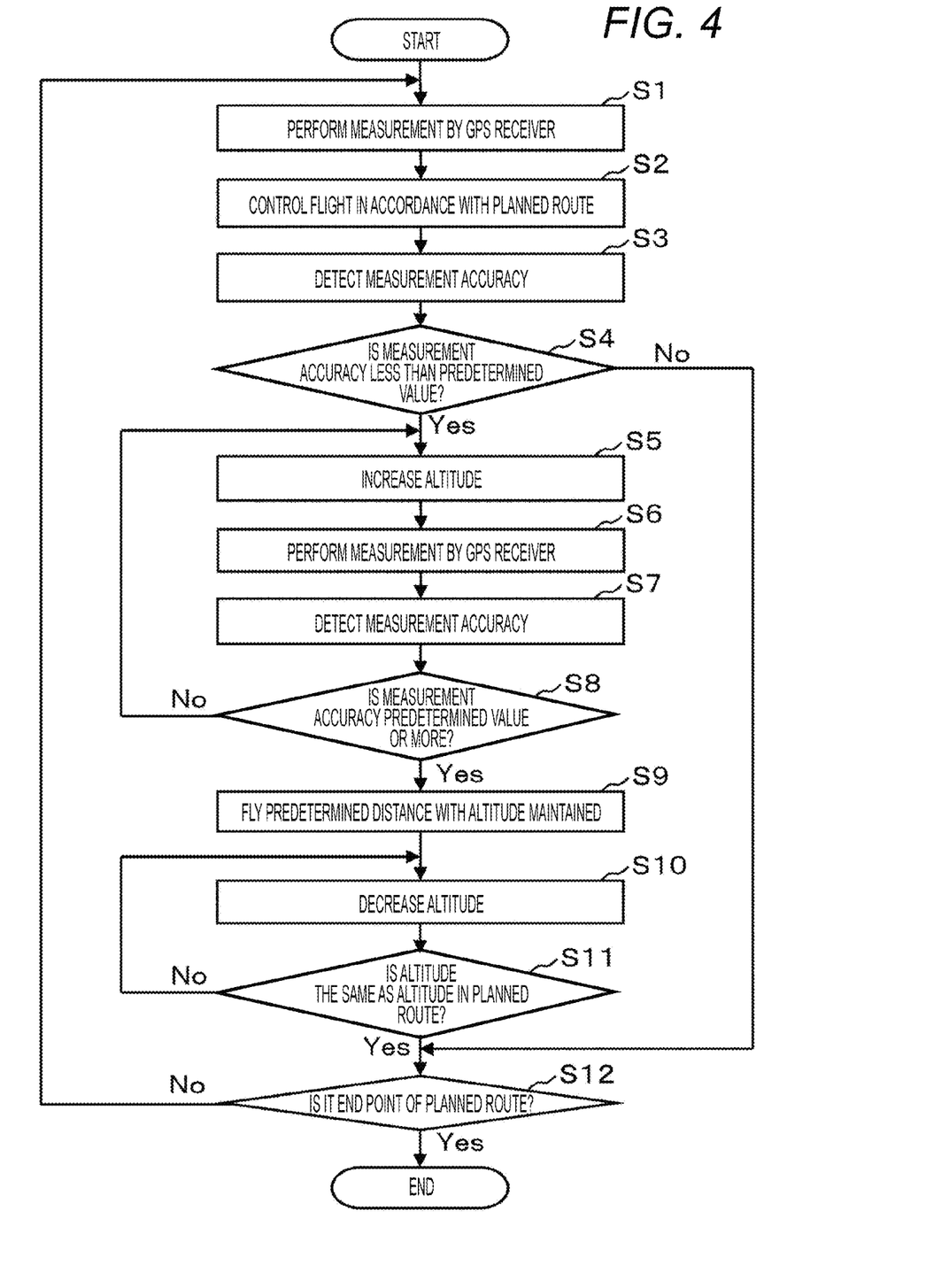
FIG. 4 is a flowchart of an operation example of the flight control device according to the first embodiment.

FIG. 4 is a flowchart of an operation example of the flight control device 100 according to the first embodiment with the structure as above. The flowchart illustrated in FIG. 4 is started when the information of the planned route 300 is set in the planned route storage unit 14 and the drone is ordered to fly.

First, the measurement unit 11 measures the position and the altitude of the drone on the basis of the GPS radio waves received in the GPS receiver 200 (step S1). Then, the flight control unit 13 controls the flight of the drone in accordance with the planned route 300 set in advance in the planned route storage unit 14 on the basis of the position and the altitude measured by the measurement unit 11 (step S2).

During the flight of the drone under the control by the flight control unit 13, the measurement accuracy detection unit 12 detects the measurement accuracy measured by the measurement unit 11 (step S3). Then, the flight control unit 13 determines whether the measurement accuracy detected by the measurement accuracy detection unit 12 has decreased to be less than a predetermined value (step S4). If the measurement accuracy is not less than the predetermined value, the process advances to step S12.

On the other hand, if the measurement accuracy is less than the predetermined value, the flight control unit 13 causes the drone to ascend higher than the planned route 300 by changing only the altitude without changing the latitude and longitude from the place where the decrease in measurement accuracy is detected (step S5). In this ascent, the measurement unit 11 still measures the position and the altitude of the drone (step S6). In addition, the measurement accuracy detection unit 12 detects the measurement accuracy measured by the measurement unit 11 (step S7).

Then, the flight control unit 13 determines whether the measurement accuracy detected by the measurement accuracy detection unit 12 has become the predetermined value or more (step S8). If the measurement accuracy is not the predetermined value or more, the process returns to step S5 and the flight control unit 13 causes the drone to keep ascending. On the other hand, if the measurement accuracy is the predetermined value or more, the flight control unit 13 causes the drone to travel by a predetermined distance or for a predetermined time along the planned route 300 without changing the horizontal trajectory of the planned route 300 while maintaining the GPS reception altitude at the place where the drone has ascended (step S9).

After that, the flight control unit 13 gradually decreases the altitude while causing the drone to travel along the planned route 300 without changing the horizontal trajectory of the planned route 300 (step S10). Then, the flight control unit 13 determines whether the altitude measured by the measurement unit 11 is the same as the altitude of the planned route 300 (step S11). If the flight altitude is not the same as the altitude in the planned route 300, the process returns to step S10 and the flight control unit 13 causes the drone to keep descending.

On the other hand, if the flight altitude of the drone measured by the measurement unit 11 is the same as the altitude of the planned route 300, the flight control unit 13 determines whether the drone has reached the end point of the planned route 300 (step S12). If the drone has not reached the end point of the planned route 300 yet, the process returns to step S1, and the flight control unit 13 continues the flight control of the drone along the planned route 300. On the other hand, if it is determined that the drone has reached the end point of the planned route 300, the process in the flowchart in FIG. 4 ends.

As described specifically above, in the first embodiment, the drone flies along the route different from the planned route if the measurement accuracy has decreased to be less than the predetermined value while the drone flies in accordance with the planned route set in advance on the basis of the position and the altitude measured by the measurement unit 11. In particular, in the first embodiment, after the drone is caused to ascend up to the place where the measurement accuracy becomes the predetermined value or more, the drone is caused to fly along the planned route and is returned to the different place on the planned route.

According to the first embodiment with the structure as above, when flying along the planned route lowers the measurement accuracy, the drone is caused to fly along the route different from the planned route; therefore, the decrease in measurement accuracy can be avoided and moreover, the flight can be continued while the position or the altitude is measured. Thus, even when the measurement accuracy of the drone flying in accordance with the planned route has decreased, the flight can be continued with the measurement accuracy secured.

Note that the first embodiment has described the example in which, when the drone is caused to ascend without changing the latitude and longitude in the ascent flight stage, the flight control unit 13 causes the drone to ascend until the measurement accuracy detected by the measurement accuracy detection unit 12 becomes the predetermined value or more; however, the present invention is not limited to this example. For example, the drone may be caused to ascend until the measurement accuracy detected by the measurement accuracy detection unit 12 after the start of the flight in the ascent flight stage is increased by a second predetermined value. Alternatively, the drone may be caused to ascend until the flight altitude becomes a predetermined altitude. In another example, the drone may be caused to ascend until the ascending amount of the flight altitude after the start of the flight in the ascent flight stage becomes a predetermined amount.

Second Embodiment

Next, a second embodiment of the present invention will hereinafter be described with reference to drawings. The functional structure of the flight control device 100 according to the second embodiment is similar to that in FIG. 1. In addition, the second embodiment is similar to the first embodiment in that when the GPS measurement accuracy has decreased to be less than the predetermined value, the drone is caused to fly along the route different from the planned route and is returned to the different place on the planned route. The second embodiment is different from the first embodiment in the different route. The different route in the second embodiment includes four stages of a backward flight stage, an ascent flight stage, a maintaining flight stage, and a descent flight stage.

Figure 5:
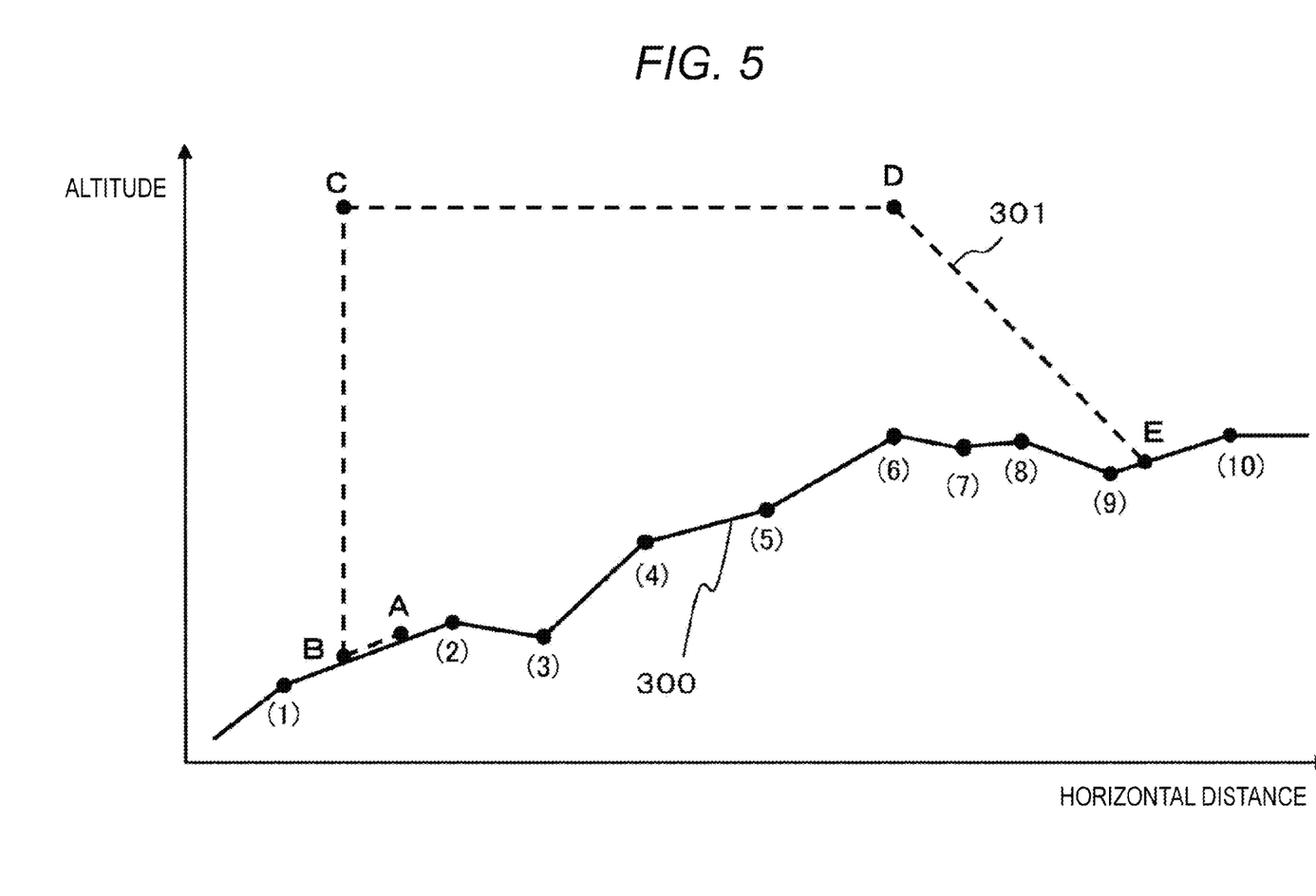
FIG. 5 is a diagram for describing a different route according to a second embodiment.

FIG. 5 is a diagram for describing the different route according to the second embodiment. In a manner similar to FIG. 3, FIG. 5 expresses the positions and the altitudes of the ten successive waypoints (1) to (10) (two-dimensional positions on a horizontal plane are not expressed). In FIG. 5, it is assumed that the measurement accuracy detected by the measurement accuracy detection unit 12 has decreased to be less than the predetermined value at the place A between the waypoint (1) and the waypoint (2) during the flight of the drone in accordance with the planned route 300. In this case, the flight control unit 13 causes the drone to fly backward on the planned route 300 from the place A (backward flight stage), and to ascend higher than the planned route 300 by changing only the altitude without changing the latitude and longitude from the place B where the drone has flown backward (ascent flight stage).

In the backward flight stage, for example, the flight control unit 13 causes the drone to fly backward by a predetermined distance on the planned route 300 from the place A where the measurement accuracy of the GPS has decreased to be less than the predetermined value. The place B where the drone has flown backward by the predetermined distance on the planned route 300 is the place where the drone flew previously, and at the place B, the GPS measurement accuracy is not less than the predetermined value. Therefore, by causing the drone to fly backward to the place B, the GPS measurement accuracy can be restored to the predetermined value or more.

Note that here, description is made of the example in which the drone is caused to fly backward by the predetermined distance from the place A; however, the present invention is not limited to this example. For example, the drone may fly backward for a predetermined time from the place A. Alternatively, the drone may fly backward to the previous waypoint from the place A (in the example in FIG. 5, to the waypoint (1)).

After that, the flight control unit 13 causes the drone to shift to the ascent flight stage, and causes the drone to ascend up to the place C with a predetermined altitude by changing only the altitude without changing the latitude and longitude from the place B to which the drone has flown backward in the backward flight stage. As described above, the GPS measurement accuracy has already restored to the predetermined value or more at the place B; therefore, if the altitude is increased from that altitude at the place B, the GPS measurement accuracy is likely to be the predetermined value or more at any altitude. Thus, the control to cause the drone to ascend up to the place where the measurement accuracy detected by the measurement accuracy detection unit 12 is the predetermined value or more as described in the first embodiment is unnecessary.

Note that the flight control unit 13 may cause the drone to ascend up to the altitude where the measurement accuracy becomes higher than the measurement accuracy detected by the measurement accuracy detection unit 12 at the backward flight place B by the second predetermined value. Alternatively, the drone may be caused to ascend until the ascending amount of the flight altitude after the start of the flight in the ascent flight stage becomes the predetermined amount.

Next, the flight control unit 13 causes the drone to shift to the maintaining flight stage, and causes the drone to travel along the planned route 300 without changing the horizontal trajectory of the planned route 300 while maintaining the altitude of the place C to which the drone has ascended in the ascent flight stage. Then, the flight control unit 13 causes the drone to shift to the descent flight stage after causing the drone to fly by a predetermined distance or fly for a predetermined time to the place D. In the descent flight stage, the flight control unit 13 controls the flight of the drone so that the drone is returned to a different place E on the planned route 300 by gradually decreasing the altitude while causing the drone to travel along the planned route 300 without changing the horizontal trajectory of the planned route 300.

According to the second embodiment in which the different route is set as above, the drone is controlled so that the drone is returned once to the place B where the GPS measurement accuracy is surely the predetermined value or more and then the drone ascends up to the predetermined altitude and flies along the different route; therefore, the ascending is minimized. That is to say, in the first embodiment, the drone is caused to ascend from the place where the GPS measurement accuracy has decreased to be less than the predetermined value; therefore, in some deep valleys, it may be necessary that the drone ascends to the very high altitude. In such cases, the drone flies very far from the river which should be inspected, so that sufficient photographing or measurement in detail may be impossible. According to the second embodiment, such inconvenience can be avoided.

Third Embodiment

Figure 6:
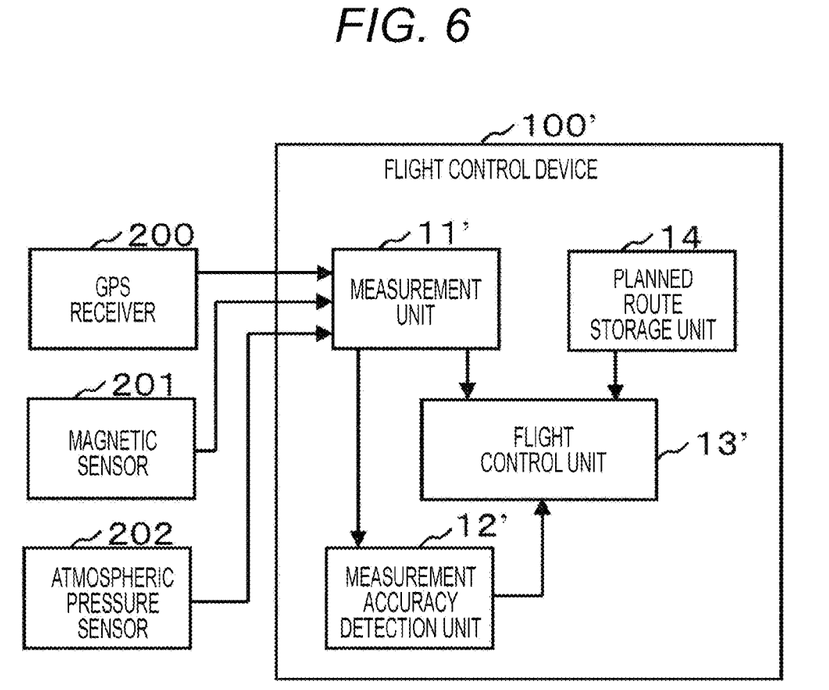
FIG. 6 is a diagram illustrating an example of a functional structure of a flight control device according to a third embodiment.

Next, a third embodiment of the present invention will be described with reference to drawings. FIG. 6 is a diagram illustrating an example of a functional structure of a flight control device 100' according to the third embodiment. In FIG. 6, a component denoted by the reference symbol shown in FIG. 1 has the same function and the description of such a component is omitted.

As illustrated in FIG. 6, in the third embodiment, a magnetic sensor 201 and an atmospheric pressure sensor 202 are provided in addition to the GPS receiver 200. The flight control device 100' includes a measurement unit 11', a measurement accuracy detection unit 12', and a flight control unit 13' instead of the measurement unit 11, the measurement accuracy detection unit 12, and the flight control unit 13 illustrated in FIG. 1.

In the third embodiment, the measurement unit 11' measures the position, the direction, and the altitude of the drone by using the GPS receiver 200, the magnetic sensor 201, and the atmospheric pressure sensor 202. The flight control unit 13' controls the flight of the drone in accordance with the position, the direction, and the altitude measured by the measurement unit 11'. Note that the atmospheric pressure sensor 202 may be omitted and the position and the altitude of the drone may be measured by the GPS receiver 200 in a manner similar to the first embodiment.

Figure 7A:
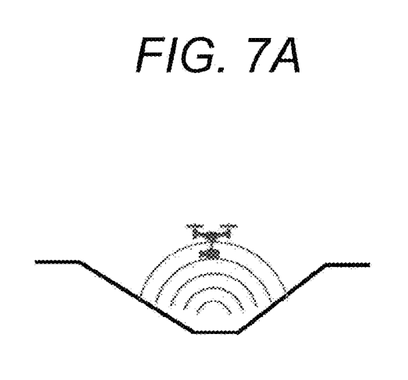
FIGS. 7A and 7B are diagrams for describing flight control of a drone when the measurement accuracy of a magnetic sensor is low.
Figure 7B:
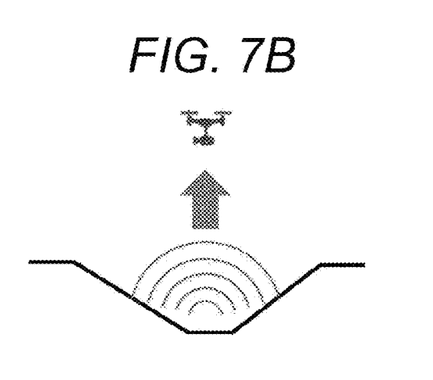

In regard to the magnetic sensor 201, the measurement accuracy may become less than the predetermined value in some areas due to the influence from a mineral vein or the like. In view of this, the measurement accuracy detection unit 12' further detects the measurement accuracy of the magnetic sensor 201 in addition to the measurement accuracy of the GPS receiver 200. Then, the flight control unit 13' controls the drone so that when the measurement accuracy of the magnetic sensor 201 detected by the measurement accuracy detection unit 12' has decreased to be less than the predetermined value, the drone ascends as illustrated in FIG. 7 and the drone flies along the route different from the planned route.

Note that in the first to third embodiments, after the drone is caused to ascend to the predetermined altitude in the ascent flight stage, the drone flies by a predetermined distance or flies for a predetermined time while maintaining the altitude in the maintaining flight stage; however, the present invention is not limited to this example. For example, the maintaining flight stage between the ascent flight stage and the descent flight stage may be omitted and the altitude may be gradually decreased immediately after the drone has ascended up to the predetermined altitude.

In the first to third embodiments, when the drone having ascended out of the planned route gradually goes down and it is detected that the measurement accuracy has decreased to be less than the predetermined value, the drone may be caused to ascend from that place again and the similar flight control may be performed again.

In the first and second embodiments, the drone flight controls in regard to the ascent flight stage, the maintaining flight stage, and the descent flight stage have been described; however, the present invention is not limited to this example and other flight controls than those above may be employed. Modifications of the flight controls in those stages will be described below in detail.

First, a modification of the flight control in the ascent flight stage is described. In the first and second embodiments, when it is detected that the measurement accuracy is less than the predetermined value, only the altitude is changed without changing the latitude and longitude at that place to make the drone ascend; however, the drone may be caused to ascend while the drone travels along the latitude and longitude of the planned route.

For example, in the modification of the first embodiment, when the measurement accuracy detected by the measurement accuracy detection unit 12 has decreased to be less than the predetermined value, the flight control unit 13 may control the flight of the drone so that the altitude is gradually increased from that place while the drone travels along the planned route without changing the horizontal trajectory of the planned route. In the modification of the second embodiment, when the measurement accuracy detected by the measurement accuracy detection unit 12 has decreased to be less than the predetermined value, the flight control unit 13 may control the flight of the drone so that the drone flies backward from that place on the planned route and the altitude is gradually increased while the drone travels along the planned route without changing the horizontal trajectory of the planned route.

Figure 8:
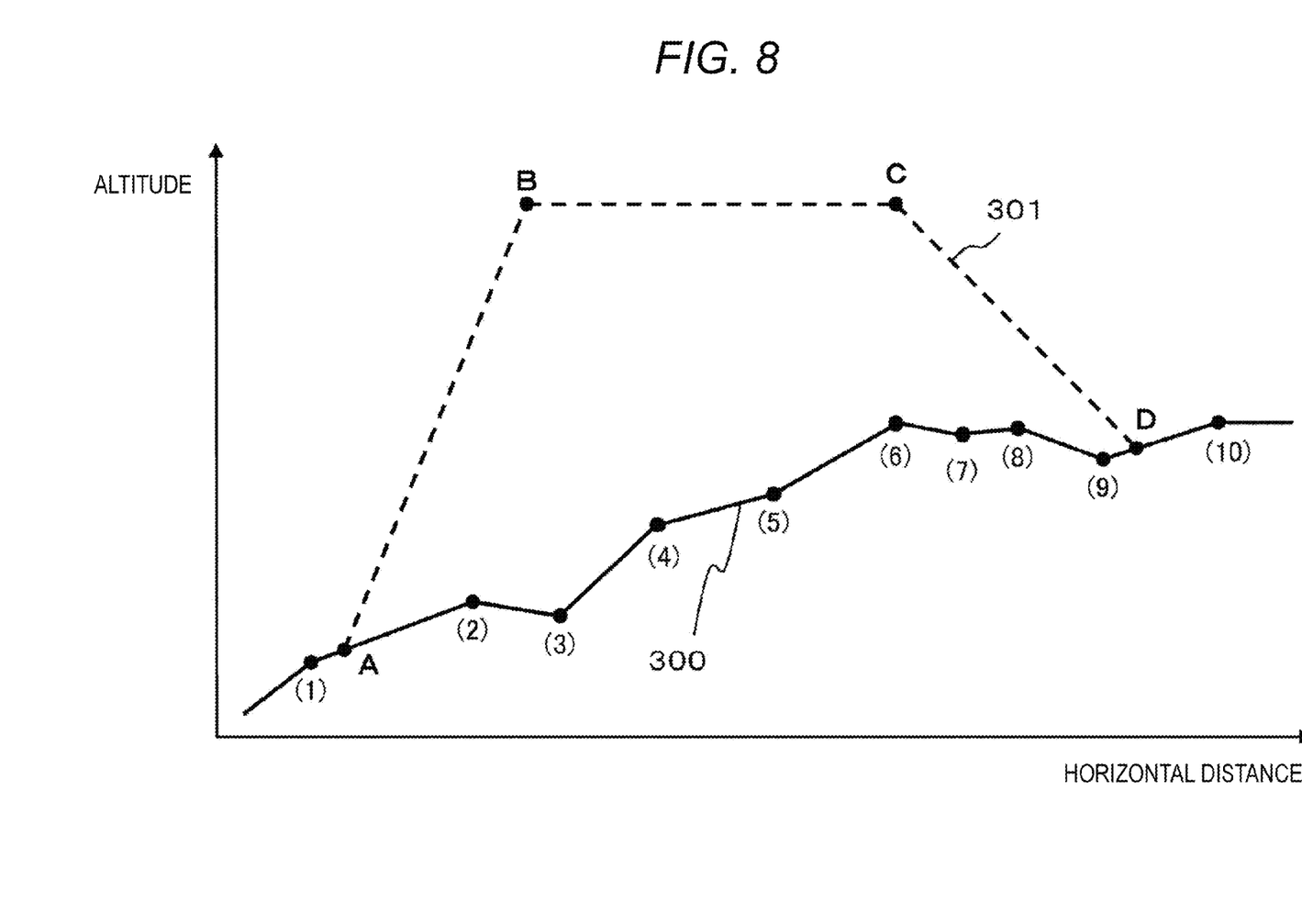
FIG. 8 is a diagram for describing a modification of the different route according to the first embodiment.

More specifically, the flight control unit 13 controls the flight of the drone so that the altitude is gradually increased at a constant rate per unit time or per unit flight distance while the drone travels along the planned route without changing the horizontal trajectory of the planned route. FIG. 8 is a diagram for describing the different route 301 in the case where such a flight control is performed. The waypoints (1) to (10) in FIG. 8 are the same as those in FIG. 3.

In FIG. 8, it is assumed that the measurement accuracy detected by the measurement accuracy detection unit 12 becomes less than the predetermined value at the place A between the waypoint (1) and the waypoint (2) during the flight of the drone in accordance with the planned route 300. In this case, in the ascent flight stage from the place A, the flight control unit 13 causes the drone to ascend higher than the planned route 300 by gradually increasing the altitude at a constant rate per unit time or per unit flight distance while causing the drone to fly along the planned route 300 without changing the horizontal trajectory of the planned route 300.

At this time, for example, the flight control unit 13 causes the drone to ascend to the place B where the measurement accuracy detected by the measurement accuracy detection unit 12 becomes the predetermined value or more. Note that the drone may be caused to ascend until the measurement accuracy detected by the measurement accuracy detection unit 12 after the start of the flight in the ascent flight stage is increased by the second predetermined value, until the flight altitude becomes the predetermined altitude, or until the amount of ascending of the flight altitude after the start of the flight in the ascent flight stage becomes the predetermined amount.

In the example in FIG. 8, the flight controls in the maintaining flight stage and the descent flight stage are similar to that in FIG. 3; therefore, the description is omitted. Note that when the measurement accuracy detected by the measurement accuracy detection unit 12 has decreased to be less than the predetermined value and the drone vertically ascends from that place without changing the latitude and longitude as illustrated in FIG. 3 or the drone flies backward once and then ascends vertically as illustrated in FIG. 5, the flight time increases, so that the reachable distance of the drone becomes shorter.

On the other hand, when the altitude is increased gradually while the drone flies forward in the ascent flight stage as illustrated in FIG. 8, the increase in flight time can be minimized. Moreover, when the drone flies linearly while the altitude is increased or decreased at a constant rate or the altitude is maintained in each of the ascent flight stage, the maintaining flight stage, and the descent flight stage, the battery consumption can be reduced. The different route 301 as illustrated in FIG. 8 is effective when the drone is used mainly in transportation, for example to transport articles.

Figure 9:
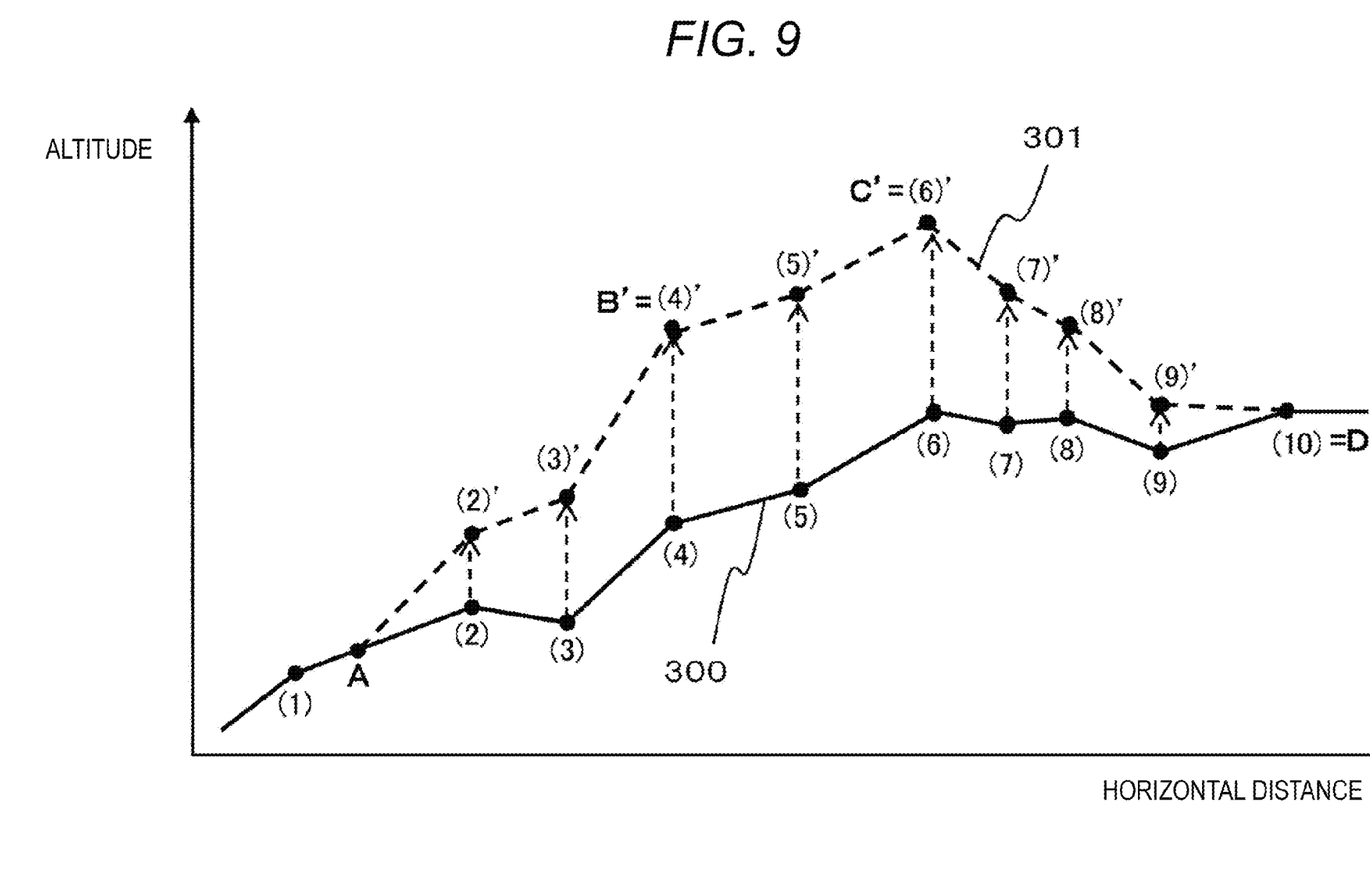
FIG. 9 is a diagram for describing a modification of the different route according to the first embodiment.

In another example of the flight control in the ascent flight stage, the flight control unit 13 may control the flight of the drone so that the altitude is gradually increased at an added rate that is obtained by adding a constant rate to a rate of altitude change for each waypoint of the planned route while causing the drone to travel along the planned route without changing the horizontal trajectory of the planned route. FIG. 9 is a diagram for describing the different route 301 in the case where such a flight control is performed. The waypoints (1) to (10) illustrated in FIG. 9 are the same as those in FIG. 3.

In FIG. 9, it is assumed that the measurement accuracy detected by the measurement accuracy detection unit 12 becomes less than the predetermined value at the place A between the waypoint (1) and the waypoint (2) during the flight of the drone in accordance with the planned route 300. In this case, first, the flight control unit 13 causes the drone to gradually ascend at an added rate that is obtained by adding a constant rate to a rate of the altitude change from the place A to the next waypoint (2) (in FIG. 9, corresponding to the angle of inclination of a line connecting between the place A and the waypoint (2)).

A place (2)' is a place after the altitude of the drone is gradually increased at a constantly added rate along the planned route 300 from the place A up to the same latitude and longitude as those of the waypoint (2). The angle of inclination of the line connecting between the place A and the place (2)' corresponds to the aforementioned added rate. When the measurement accuracy detected by the measurement accuracy detection unit 12 becomes less than the predetermined value, the flight control unit 13 may set this place (2)' as an additional waypoint (2)' and control so that the drone flies toward the additional waypoint (2)'.

Next, the flight control unit 13 causes the drone to gradually ascend at an added rate that is obtained by adding a constant rate to the rate of the altitude change from the waypoint (2) to the next waypoint (3) on the planned route 300. Note that in FIG. 9, the altitude is gradually decreased from the waypoint (2) to the next waypoint (3). That is to say, the rate of the altitude change is a negative value. In this case, the flight control unit 13, for example, employs the absolute value of the rate of the altitude change and causes the drone to gradually ascend at an added rate that is obtained by adding a constant rate to the absolute value.

A place (3)' corresponds to a place after the altitude of the drone is increased gradually at a constantly added rate along the planned route 300 from the additional waypoint (2)' up to the same latitude and longitude as those of the waypoint (3). When the measurement accuracy detected by the measurement accuracy detection unit 12 becomes less than the predetermined value or when the drone has reached the additional waypoint (2)' the flight control unit 13 may set the place (3)' as an additional waypoint (3)' and control so that the drone flies toward the additional waypoint (3)'.

Similarly, the flight control unit 13 causes the drone to gradually ascend from the additional waypoint (3)' to a similarly added waypoint (4)' at an added rate that is obtained by adding a constant rate to the rate of the altitude change from the waypoint (3) to the next waypoint (4) on the planned route 300. In the example in FIG. 9, the flight from the place A to the place B' of the additional waypoint (4)' corresponds to the flight control in the ascent flight stage.

Note that the additional waypoint (4)' where the ascent flight stage is terminated may be, for example, a place where the measurement accuracy detected by the measurement accuracy detection unit 12 becomes the predetermined value or more. This place is the place where the measurement accuracy detected by the measurement accuracy detection unit 12 becomes the predetermined value or more for the first time among the altitude ascent places corresponding to the plural waypoints at or after the place A (among the places with the same latitude and longitude as those of the waypoints on the planned route 300 where the altitude is higher than that of those waypoints). Alternatively, the ascent flight stage may be terminated at a place where the measurement accuracy detected by the measurement accuracy detection unit 12 after the start of the flight in the ascent flight stage is increased by the second predetermined value or more. In those cases, one waypoint is added and whether the measurement accuracy satisfies the aforementioned condition is determined every time the drone reaches the added waypoint. If the condition is not satisfied, the next waypoint is added; this operation is repeated.

The additional waypoint (4)' where the ascent flight stage is terminated may be the place among the altitude ascent places corresponding to the plural waypoints at or after the place A where the flight altitude of the drone is the predetermined altitude or more or where the ascending amount of the flight altitude after the start of the flight in the ascent flight stage at the place A becomes the predetermined amount or more. In these cases, at the place A, it is possible to add one or more waypoints in advance before the place where the flight altitude of the drone satisfies the aforementioned condition.

Next, a modification of the flight control in the maintaining flight stage is described. In the first and second embodiments, the flight control unit 13 causes the drone to, in the maintaining flight stage, travel along the planned route while maintaining the flight altitude after the ascending in the ascent flight stage. In contrast to this, while maintaining the difference in altitude from the planned route at the place where the flight in the ascent flight stage ends, the flight control unit 13 may control the flight of the drone so that the drone travels along the planned route without changing the horizontal trajectory of the planned route.

In the example in FIG. 9, the flight section from the place B' of the additional waypoint (4)' to the place C' of the additional waypoint (6)' is the flight section in the maintaining flight stage. That is to say, in the example in FIG. 9, the flight control unit 13 controls the flight of the drone so that the drone travels to the additional waypoint (6)' along the planned route 300 while maintaining the difference in altitude between the additional waypoint (4)' as the place B' where the ascent flight stage ends and the corresponding waypoint (4) of the planned route 300. The number of flight sections in the maintaining flight stage may be, for example, the predetermined number of waypoints.

Finally, a modification of the flight control in the descent flight stage is described. In the first and second embodiments, the flight control unit 13 gradually decreases the altitude at a constant rate per unit time or per unit flight distance while causing the drone to travel along the planned route in the descent flight stage; however, the altitude may be decreased gradually at an added rate that is obtained by adding a constant rate to the rate of the altitude change for each waypoint on the planned route.

In the example in FIG. 9, the section from the place C' of the additional waypoint (6)' to the place D of the waypoint (10) corresponds to the flight section in the descent flight stage. That is to say, in the example in FIG. 9, the flight control unit 13 gradually decreases the altitude at an added rate that is obtained by adding a constant rate to the rate of the altitude change (absolute value) for each waypoint on the planned route 300 to the additional waypoint (9)' while causing the drone to travel along the planned route 300 from the additional waypoint (6)' corresponding to the place C' where the flight in the maintaining flight stage ends. The section from the final additional waypoint (9)' to the waypoint (10) on the planned route 300 corresponds to the section where the different route 301 connects to the planned route 300.

The different route 301 in FIG. 9 is effective when the drone flies for aerial photographing along the planned route 300 that is relatively complicated. This is because the drone can fly at the altitude higher than the original planned route 300 while maintaining the route shape similar to that of the planned route 300. Here, the planned route 300 that is relatively complicated is the route where a number of waypoints exist and the adjacent waypoints are set relatively close to each other. For example, in the case of photographing a road in the mountains from the sky with a camera mounted on the drone, the drone flies with the constant distance from the road right above the road; therefore, a number of waypoints are set. In such a case, causing the drone to fly along the different route 301 illustrated in FIG. 9 makes it possible to photograph an image that makes a user feel less discomfort because the user feels the drone ascend less suddenly when the measurement accuracy has dropped.

Note that the flight controls of the aforementioned patterns in the ascent flight stage (vertical ascent pattern illustrated in FIG. 3, linear ascent pattern illustrated in FIG.

8, and the ascent pattern that depends on the original route illustrated in FIG. 9), the flight controls of the patterns in the maintaining flight stage (altitude maintaining pattern illustrated in FIG. 3 and FIG. 8, and the altitude difference maintaining pattern illustrated in FIG. 9), and the flight controls of the patterns in the descent flight stage (linear descent pattern illustrated in FIG. 3 and FIG. 8, and the descent pattern that depends on the original route illustrated in FIG. 9) can be combined arbitrarily and employed. The arbitrary combination of these can be applied to any of the ascent flight stage, the maintaining flight stage, and the descent flight stage after the backward flight stage illustrated in FIG. 5.

Figure 10:
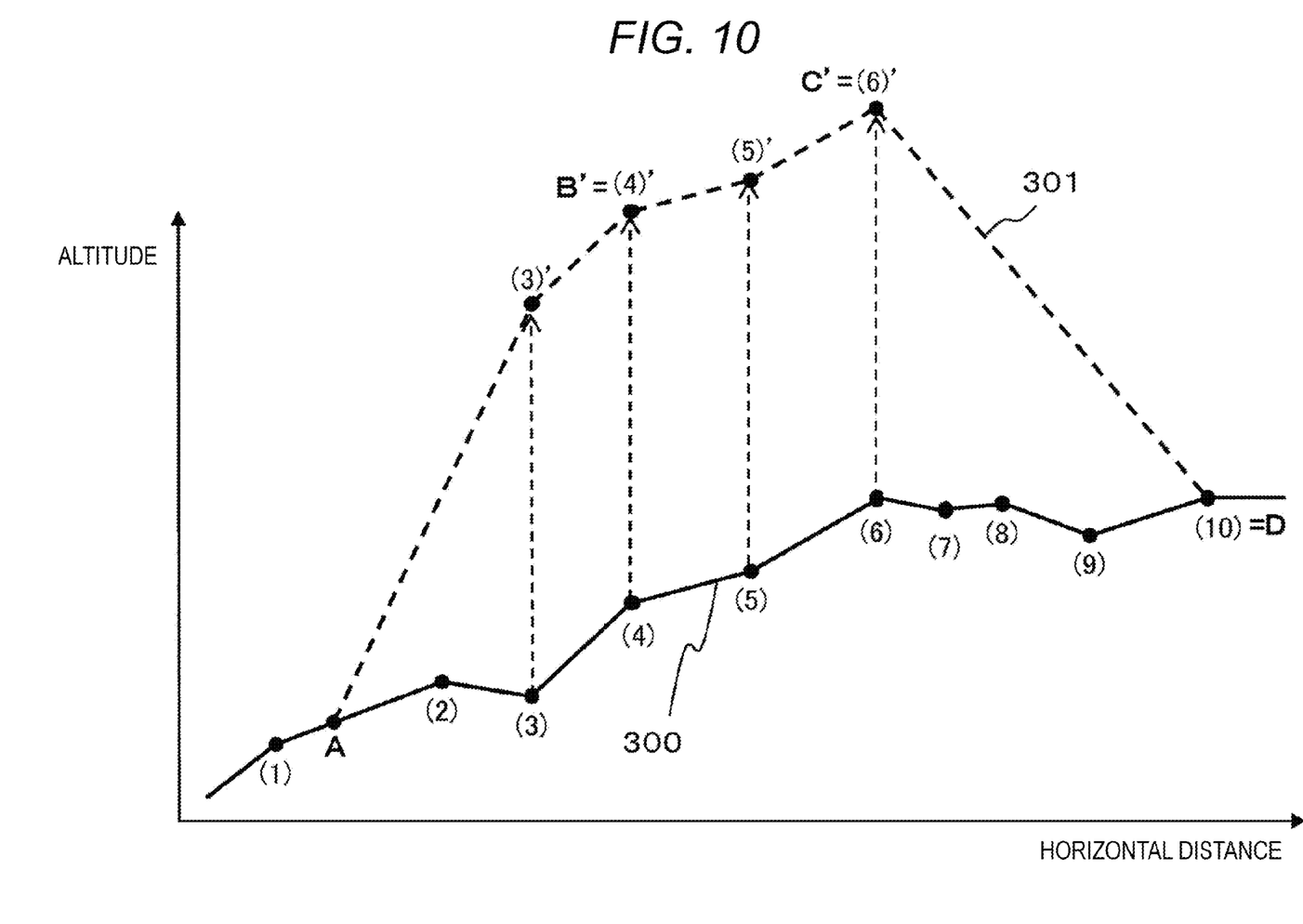
FIG. 10 is a diagram for describing a modification of the different route according to the first embodiment.

FIG. 10 is a diagram illustrating the different route 301 in which the linear ascent pattern in the ascent flight stage, the altitude difference maintaining pattern in the maintaining flight stage, and the linear descent pattern in the descent flight stage are combined. The different route 301 illustrated in FIG. 10 is effective when the drone flies for aerial photographing and the adjacent waypoints are set relatively far from each other, like when the camera mounted on the drone photographs a river in the mountains.

In the different route 301 illustrated in FIG. 3, FIG. 5, and FIG. 8, when the drone travels along the planned route 300 without changing the horizontal trajectory of the planned route 300, the drone may be controlled so that the altitude ascent places corresponding to the waypoints (2) to (9) are set as the additional waypoints and the drone flies toward the additional waypoints.

In the first to third embodiments, when it is detected that the measurement accuracy of the GPS receiver 200 or the magnetic sensor 201 has decreased to be less than the predetermined value at the end of the planned route, the drone will ascend and fail to land on the end point. In view of this, when the decrease in measurement accuracy to be less than the predetermined place is detected, whether that place is the end point of the planned route is determined and if that place is the end point, the drone may fly (land) as set in the planned route.

Alternatively, whether the place where the decrease in measurement accuracy is detected is in a range of a predetermined distance from the end point of the planned route is determined; if the place is in the range of the predetermined distance, the drone is controlled to hover at that place and the autonomous flight may be changed to the manual flight mode.

In the first to third embodiments, in the case where the drone with the camera flies while photographing, the zooming of the camera may be controlled in accordance with the increasing altitude out of the planned route. That is to say, the image is gradually magnified when the drone ascends and the image is gradually reduced when the drone descends.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A flight control device for an unmanned aerial vehicle, comprising:
    a measurement unit that measures a position and an altitude of the unmanned aerial vehicle based at least in part on signals received from outside of the unmanned aerial vehicle;
    a flight control unit that controls flight of the unmanned aerial vehicle in accordance with a planned route that is set in advance using a plurality of waypoints on the basis of the position and the altitude measured by the measurement unit; and
    a measurement accuracy detection unit that detects a measurement accuracy of the measurement unit based on the signals received from outside the unmanned aerial vehicle,
    wherein the flight control unit performs control so that the unmanned aerial vehicle flies along a route different from the planned route when the measurement accuracy detected by the measurement accuracy detection unit becomes less than a predetermined value.

2. The flight control device for an unmanned aerial vehicle according to claim 1,
    wherein the flight control unit controls the flight of the unmanned aerial vehicle so that when the measurement accuracy detected by the measurement accuracy detection unit becomes less than the predetermined value, the unmanned aerial vehicle ascends higher than the planned route from that place where the measurement accuracy becomes less than the predetermined value, and then is returned to a different place on the planned route.

3. The flight control device for an unmanned aerial vehicle according to claim 2,
    wherein the flight control unit controls the flight of the unmanned aerial vehicle in an ascent flight stage so that when the measurement accuracy detected by the measurement accuracy detection unit becomes less than the predetermined value, the unmanned aerial vehicle ascends by changing only the altitude without changing a latitude and a longitude of the place where the measurement accuracy becomes less than the predetermined value.

4. The flight control device for an unmanned aerial vehicle according to claim 2,
    wherein the flight control unit controls the flight of the unmanned aerial vehicle in the ascent flight stage so that when the measurement accuracy detected by the measurement accuracy detection unit becomes less than the predetermined value, the altitude is gradually increased while causing the unmanned aerial vehicle to travel along the planned route without changing a horizontal trajectory of the planned route from that place where the measurement accuracy becomes less than the predetermined value.

5. The flight control device for an unmanned aerial vehicle according to claim 4,
    wherein the flight control unit controls the flight of the unmanned aerial vehicle so that the altitude is gradually increased at a constant rate per unit time or per unit flight distance while causing the unmanned aerial vehicle to travel along the planned route without changing the horizontal trajectory of the planned route in the ascent flight stage.

6. The flight control device for an unmanned aerial vehicle according to claim 4, wherein the flight control unit controls the flight of the unmanned aerial vehicle so that the altitude is gradually increased at an added rate that is obtained by adding a constant rate to a rate of altitude change for each waypoint on the planned route while causing the unmanned aerial vehicle to travel along the planned route without changing the horizontal trajectory of the planned route in the ascent flight stage.

7. The flight control device for an unmanned aerial vehicle according to claim 6,
wherein the flight control unit causes the unmanned aerial vehicle to ascend until the measurement accuracy detected by the measurement accuracy detection unit becomes the predetermined value or more, until the measurement accuracy detected by the measurement accuracy detection unit after start of the flight in the ascent flight stage is increased by a second predetermined value or more, until a flight altitude becomes a predetermined altitude or more, or until an ascending amount of the flight altitude after the start of the flight in the ascent flight stage becomes a predetermined amount or more.

8. The flight control device for an unmanned aerial vehicle according to claim 4,
wherein the flight control unit controls the flight of the unmanned aerial vehicle in a maintaining flight stage so that after causing the unmanned aerial vehicle to ascend higher than the planned route in the ascent flight stage, the unmanned aerial vehicle travels along the planned route without changing the horizontal trajectory of the planned route while maintaining the flight altitude.

9. The flight control device for an unmanned aerial vehicle according to claim 4,
wherein the flight control unit controls the flight of the unmanned aerial vehicle in a maintaining flight stage so that after causing the unmanned aerial vehicle to ascend higher than the planned route in the ascent flight stage, the unmanned aerial vehicle travels along the planned route without changing the horizontal trajectory of the planned route while maintaining an altitude difference from the planned route at that place where the unmanned aerial vehicle has ascended.

10. The flight control device for an unmanned aerial vehicle according to claim 4,
wherein the flight control unit controls the flight of the unmanned aerial vehicle in a descent flight stage so that after causing the unmanned aerial vehicle to ascend higher than the planned route in the ascent flight stage, the altitude is gradually decreased while causing the unmanned aerial vehicle to travel along the planned route without changing the horizontal trajectory of the planned route and the unmanned aerial vehicle is returned to a different place on the planned route.

11. The flight control device for an unmanned aerial vehicle according to claim 8,
wherein the flight control unit controls the flight of the unmanned aerial vehicle in a descent flight stage so that after causing the unmanned aerial vehicle to fly in the maintaining flight stage, the altitude is gradually decreased while causing the unmanned aerial vehicle to travel along the planned route without changing the horizontal trajectory of the planned route and the unmanned aerial vehicle is returned to a different place on the planned route.

12. The flight control device for an unmanned aerial vehicle according to claim 11,
wherein the flight control unit controls the flight of the unmanned aerial vehicle so that the altitude is gradually decreased at a constant rate per unit time or per unit flight distance while causing the unmanned aerial vehicle to travel along the planned route without changing the horizontal trajectory of the planned route in the descent flight stage.

13. The flight control device for an unmanned aerial vehicle according to claim 11,
wherein the flight control unit controls the flight of the unmanned aerial vehicle so that the altitude is gradually decreased at an added rate that is obtained by adding a constant rate to a rate of altitude change for each waypoint on the planned route while causing the unmanned aerial vehicle to travel along the planned route without changing the horizontal trajectory of the planned route in the descent flight stage.

14. The flight control device for an unmanned aerial vehicle according to claim 1,
wherein the flight control unit controls the flight of the unmanned aerial vehicle so that when the measurement accuracy detected by the measurement accuracy detection unit becomes less than the predetermined value, the unmanned aerial vehicle flies backward on the planned route from that place where the measurement accuracy becomes less than the predetermined value and then ascends higher than the planned route from a backward flight place, and subsequently is returned to a different place on the planned route.

15. The flight control device for an unmanned aerial vehicle according to claim 14,
wherein the flight control unit causes the unmanned aerial vehicle to fly backward on the planned route by a predetermined distance or for a predetermined time from a place where the measurement accuracy detected by the measurement accuracy detection unit becomes less than the predetermined value.

16. The flight control device for an unmanned aerial vehicle according to claim 14,
wherein the flight control unit causes the unmanned aerial vehicle to fly backward to a previous waypoint on the planned route from the place where the measurement accuracy detected by the measurement accuracy detection unit becomes less than the predetermined value.

17. The flight control device for an unmanned aerial vehicle according to claim 14,
wherein the flight control unit controls the flight of the unmanned aerial vehicle in the ascent flight stage so that the unmanned aerial vehicle ascends from the backward flight place by changing only the altitude without changing a latitude and a longitude of that backward flight place.

18. The flight control device for an unmanned aerial vehicle according to claim 14,
wherein the flight control unit controls the flight of the unmanned aerial vehicle in the ascent flight stage so that the altitude is gradually increased from the backward flight place while causing the unmanned aerial vehicle to travel along the planned route without changing the horizontal trajectory of the planned route.

19. The flight control device for an unmanned aerial vehicle according to claim 14,
wherein the flight control unit causes the unmanned aerial vehicle to ascend until a flight altitude becomes a predetermined altitude or more, until an ascending amount of the flight altitude after start of the flight in the ascent flight stage becomes a predetermined amount or more, or until the measurement accuracy becomes higher than the measurement accuracy detected by the measurement accuracy detection unit at the backward flight place by a second predetermined value or more.

20. A method of controlling flight of an unmanned aerial vehicle by a flight control device included in the unmanned aerial vehicle, the method comprising:
- a first step in which a measurement unit of the flight control device measures a position and an altitude of the flight control device based at least in part on signals received from outside of the unmanned aerial vehicle;
- a second step in which a flight control unit of the flight control device controls the flight of the unmanned aerial vehicle in accordance with a planned route that is set in advance on the basis of the position and the altitude measured by the measurement unit;
- a third step in which a measurement accuracy detection unit of the flight control device detects a measurement accuracy of the measurement unit, based on the signals received from outside the unmanned aerial vehicle, during the flight of the unmanned aerial vehicle under control by the flight control unit; and
- a fourth step in which the flight control unit of the flight control device controls the unmanned aerial vehicle so that the unmanned aerial vehicle flies along a route different from the planned route when it is determined that the measurement accuracy detected by the measurement accuracy detection unit becomes less than a predetermined value.

* * * * *